(12) United States Patent  (10) Patent No.:   US 12,263,733 B2
Kunikane                   (45) Date of Patent:      Apr. 1, 2025

(54) DISPLAY CONTROL DEVICE, DISPLAY CONTROL SYSTEM, AND GENERATION METHOD

(71) Applicant: DENSO TEN Limited, Hyogo (JP)

(72) Inventor: Noriaki Kunikane, Kobe (JP)

(73) Assignee: DENSO TEN Limited, Kobe (JP)

( * ) Notice: Subject to any disclaimer, the term of this patent is extended or adjusted under 35 U.S.C. 154(b) by 115 days.

(21) Appl. No.: 18/186,452

(22) Filed: Mar. 20, 2023

(65) Prior Publication Data

US 2023/0331086 A1    Oct. 19, 2023

(30) Foreign Application Priority Data

Apr. 18, 2022  (JP) ................. 2022-068525

(51) Int. Cl.
*B60K 35/00* (2024.01)
*B60K 35/22* (2024.01)
*B60K 35/29* (2024.01)

(52) U.S. Cl.
CPC .............. *B60K 35/00* (2013.01); *B60K 35/22* (2024.01); *B60K 35/29* (2024.01); *B60K 2360/1868* (2024.01)

(58) Field of Classification Search
CPC ........ B60K 35/00; B60K 35/22; B60K 35/29; B60K 2360/1868; B60K 2360/174; B60K 35/28

See application file for complete search history.

(56) References Cited

U.S. PATENT DOCUMENTS

| | | | | |
|---|---|---|---|---|
| 7,432,927 | B2 * | 10/2008 | Iguchi | G06T 11/206 |
| | | | | 345/440 |
| 9,335,885 | B1 * | 5/2016 | Brocato | G06F 3/0489 |
| 10,944,642 | B1 * | 3/2021 | Babcock | H04L 41/12 |
| 2003/0065600 | A1 * | 4/2003 | Terashima | G06Q 40/06 |
| | | | | 705/36 R |
| 2006/0047623 | A1 * | 3/2006 | Kimura | H04L 69/329 |
| 2007/0046675 | A1 * | 3/2007 | Iguchi | G06T 11/206 |
| | | | | 345/441 |
| 2009/0093930 | A1 * | 4/2009 | Hatano | G09B 9/052 |
| | | | | 701/41 |
| 2016/0019559 | A1 * | 1/2016 | Borack | G06Q 30/0201 |
| | | | | 705/7.29 |
| 2016/0288797 | A1 * | 10/2016 | Takahashi | G07C 5/0808 |
| 2017/0255684 | A1 * | 9/2017 | Kunimura | G06Q 10/105 |
| 2017/0305434 | A1 * | 10/2017 | Ratnasingam | G05D 1/0011 |
| 2019/0258743 | A1 * | 8/2019 | Convertino | G06F 16/90 |
| 2019/0344798 | A1 * | 11/2019 | Motomura | B60W 40/09 |
| 2020/0134243 | A1 * | 4/2020 | Vardi | G06F 30/27 |
| 2020/0274874 | A1 * | 8/2020 | Kamei | H04L 63/0236 |
| 2021/0182133 | A1 * | 6/2021 | Donegan | G06F 11/0721 |
| 2022/0027199 | A1 * | 1/2022 | Desikachari | G06F 9/5011 |

(Continued)

FOREIGN PATENT DOCUMENTS

JP    2010-039888 A    2/2010

*Primary Examiner* — Timothy R Newlin

(74) *Attorney, Agent, or Firm* — Oliff PLC

(57) ABSTRACT

A display control device displays a result that is provided by evaluating driving of a vehicle that is executed by a driver for each evaluation item and includes a control unit that displays, on a display device, a radar chart where a display group that includes the evaluation item is provided as an item thereof and a score rate of the display group is provided as a value of the item.

8 Claims, 4 Drawing Sheets

(56) References Cited

U.S. PATENT DOCUMENTS

| | | | |
|---|---|---|---|
| 2022/0327423 A1* | 10/2022 | Tsuzuki | G06N 20/00 |
| 2023/0123236 A1* | 4/2023 | Kuebler | G06Q 10/06393 |
| | | | 705/7.11 |
| 2023/0267399 A1* | 8/2023 | Howard | G06Q 10/06398 |
| | | | 705/7.42 |
| 2024/0160182 A1* | 5/2024 | Esaki | H04L 9/0825 |

* cited by examiner

| USER ID | EVALUATION ITEM 1 | EVALUATION ITEM 2 | EVALUATION ITEM 3 | EVALUATION ITEM 4 | ... |
|---|---|---|---|---|---|
| U01 | GR1 | GR2 | GR1 | GR1 | ... |
| U02 | GR11 | GR11 | GR11 | GR12 | ... |
| ... | ... | ... | ... | ... | ... |

DISPLAY CONTROL DEVICE, DISPLAY CONTROL SYSTEM, AND GENERATION METHOD

CROSS-REFERENCE TO RELATED APPLICATION(S)

This application is based upon and claims the benefit of priority to Japanese Patent Application No. 2022-068525, filed on Apr. 18, 2022, the entire contents of which are herein incorporated by reference.

FIELD

A disclosed embodiment(s) relate(s) to a display control device, a display control system, and a generation method.

BACKGROUND

A display control device that evaluates driving that is executed by a driver for a vehicle has been provided conventionally. For example, such a display control device executes an evaluation for each preliminarily set evaluation item and notifies a driver of an evaluation result by using a radar chart (see, for example, Japanese Laid-open Patent Publication No. 2010-039888).

However, in a conventional technique, for example, as an evaluation item(s) is/are increased, a number of an item(s) of a radar chart is increased, so that degradation of a visibility thereof may be caused.

SUMMARY

A display control device according to an aspect of an embodiment is a display control device that displays a result that is provided by evaluating driving of a vehicle that is executed by a driver for each evaluation item, and includes a control unit that displays, on a display device, a radar chart where a display group that includes the evaluation item is provided as an item thereof and a score rate of the display group is provided as a value of the item.

BRIEF DESCRIPTION OF DRAWING(S)

DESCRIPTION OF EMBODIMENT(S)

Hereinafter, an embodiment(s) of a display control device, a display control system, and a generation method as disclosed in the present application will be explained in detail with reference to the accompanying drawing(s). Additionally, the present invention is not limited by an embodiment(s) as illustrated below.

Figure 1:
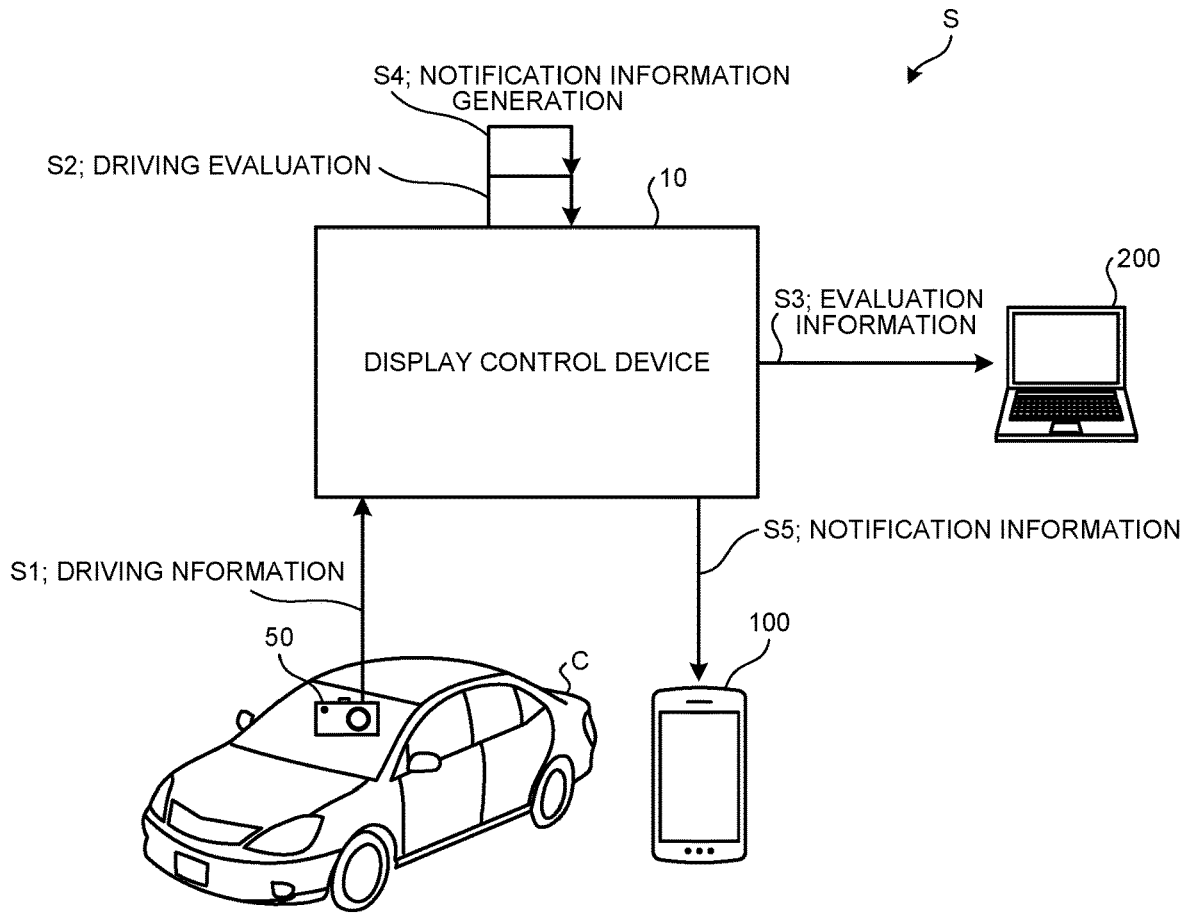
FIG. 1 is a diagram that illustrates an outline of a display control system.
Figure 2:
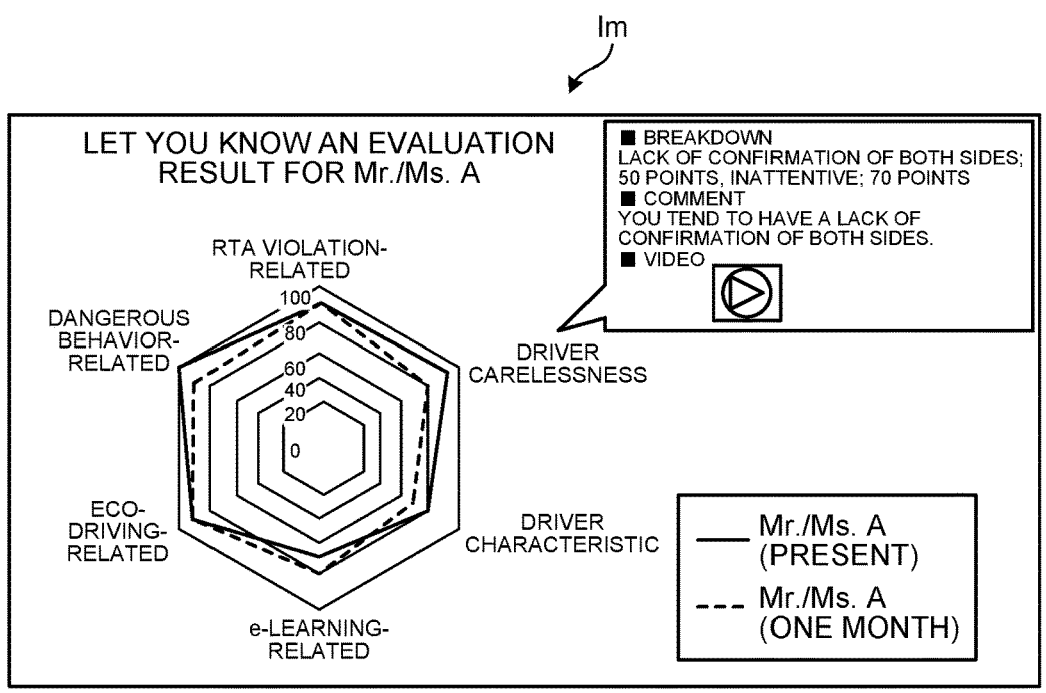
FIG. 2 is a diagram that illustrates an example of a radar chart.

First, an outline of a display control device, a display control system, and a generation method according to an embodiment will be explained by using FIG. 1 and FIG. 2. FIG. 1 is a diagram that illustrates an outline of a display control system. FIG. 2 is a diagram that illustrates an example of a radar chart.

As illustrated in FIG. 1, a display control system S according to an embodiment is a system that executes various types of evaluations concerning driving such as, for example, safe driving and/or eco-driving of a driver and feeds back an evaluations result. Furthermore, for example, the display control system S is introduced by a delivery company that provides a delivery vehicle such as a taxi and/or a truck, as well as a business operator that has a business vehicle.

As illustrated in FIG. 1, the display control system S according to an embodiment includes a display control device 10 and an on-vehicle device 50. The on-vehicle device 50 is, for example, a dashboard camera with a communication function.

The on-vehicle device 50 stores image information where an image of a surrounding of a vehicle C is captured or transmits such image information to the display control device 10. Additionally, the on-vehicle device 50 may capture an image of, for example, an inside (for example, a driver seat) of a vehicle C and transmit image information to the display control device 10.

Furthermore, the on-vehicle device 50 acquires driving information concerning driving of a vehicle C and transmits it to the display control device 10. Driving information is, for example, information that is detected by various types of sensors that are provided on a vehicle C. For example, driving information includes positional information, vehicle speed information, acceleration information, steering information, etc., of a vehicle C in addition to image information as described above.

The display control device 10 evaluates driving of each vehicle C based on driving information that is acquired from each on-vehicle device 50. Additionally, for example, the display control device 10 is configured as a cloud server that provides a cloud service through a network such as the Internet and/or a mobile phone line network.

Furthermore, as illustrated in FIG. 1, the display control device 10 is connected to a driver terminal 100 and/or a manager terminal 200 through a network. The driver terminal 100 is a terminal that is possessed by a driver for each vehicle C, and is a smartphone in an example as illustrated in FIG. 1.

The manager terminal 200 is a terminal that is possessed by a manager that manages an operational situation, etc., of each vehicle C, and is a notebook Personal Computer (PC) in an example as illustrated in FIG. 1. For example, the manager terminal 200 displays information that is notified of by the display control device 10, so as to notify a manger of an evaluation result, etc., for each driver.

Herein, an outline of information processing according to an embodiment will be explained by using FIG. 1. For example, the display control device 10 acquires driving information from the on-vehicle device 50 with a predetermined period (step S1), and executes a driving evaluation of a driver for each evaluation item based on acquired driving information (step S2). For example, the display control device 10 executes a driving evaluation according to a point-deduction method where point deduction is executed on an as-needed basis, based on driving information, for example, in a case where an event that is a target for point deduction is detected.

Subsequently, the display control device 10 notifies the manager terminal 200 of evaluation information concerning an evaluation result for each evaluation in a driving evaluation (step S3). For example, evaluation information includes various types of information that is needed by a manager in real time, such as information concerning a current evaluation result, and/or a current place and/or a running route of a vehicle C.

For example, the display control device 10 periodically executes such processes at steps S1 to S3. Subsequently, for example, the display control device 10 generates notification information at a predetermined timing (step S4) and distributes generated notification information to the driver terminal 100 (step S5). Additionally, the driver terminal 100 herein corresponds to an example of a display device. Furthermore, a display device is not limited to the driver terminal 100 and may include any display device such as a display unit 62 (see FIG. 3) that is connected to the manager terminal 200 and/or the on-vehicle device 50.

Notification information is, for example, information for notifying a driver of an evaluation result, and includes a radar chart that indicates an evaluation result (a score) for each evaluation item. Meanwhile, for a driving evaluation, an evaluation item that has not been able to be evaluated conventionally is evaluable by, for example, development of a communication technique and/or an image analysis technique.

Hence, as a score of each evaluation result is displayed in a radar chart, such a radar chart is complicated with increasing an evaluation item, so that a visibility of such a radar chart is degraded. On the other hand, for example, it is also possible to consider that a plurality of evaluation items are collected and a total score for such a plurality of evaluation items is displayed as each item of a radar chart. In such a case, as a number of an evaluation item(s) is different among respective items of a radar chart, a highest score (a perfect score) may be different among respective items of such a radar chart, so that a result of such a radar chart is not readily understood intuitively.

Hence, in a generation method according to an embodiment, a display group is set based on an evaluation item(s), and then, a radar chart where a score rate of each display group is displayed in each item is generated.

As illustrated in FIG. 2, notification information Im includes a radar chart. In an example of a radar chart as illustrated in FIG. 2, a case is illustrated where a total of six display groups, such as "Road Traffic Act (RTA) violation-related", "Driver carelessness", "Driver characteristic", "e-Learning-related", "Eco-driving-related", and "Dangerous driving-related", are included therein.

A specific example of an evaluation item in "Road Traffic Act (RTA) violation-related" includes speed exceedance, temporary non-stop, no entry/wrong-way driving, parking/stopping violation, and traffic light ignorance. Furthermore, "Driver carelessness" includes a lack of confirmation of both sides, inattentive driving, drowsy driving, and (smartphone-) distracted driving. Furthermore, "Driver characteristic" includes cognition of a driver, hurry impulse, kindly driving, patience, a repetitive acceleration and deceleration driving history, etc. Furthermore, "e-Learning-related" includes an attendance rate and a course duration of e-Learning. Furthermore, "Eco-driving-related" includes sudden starting, sudden braking, etc. Furthermore, "Dangerous behavior-related" includes sudden acceleration, sudden deceleration, abrupt steering, a dangerous inter-vehicle distance, wobble, dangerous backward driving, etc.

As the driver terminal 100 or the manager terminal 200 is operated, it is possible to add or delete any evaluation item to/from each display groups. Furthermore, a name(s) and/or a number of a display group(s) is/are also not limited to that/those in an example of FIG. 2 where it is possible to set any one.

Herein, a radar chart displays a score rate of each display group in each item thereof. Herein, a score rate is "(a total of actual scores for evaluation items in a display group)/(an upper limit of a total of scores in such a display group)".

That is, a score rate of each display group is adopted for each item of a radar chart, so that each item of such a radar chart is normalized. Hence, even if respective evaluation items in display groups are different, it is possible to understand a result of a radar chart intuitively.

Furthermore, as illustrated in FIG. 2, for example, as each item of a radar chart is selected, a content(s) concerning a display group that corresponds to such an item is/are displayed. For example, a content(s) include(s) a breakdown of a score for each evaluation item in a display group, a comment(s) on an evaluation result in a display group, and a video(s) that influence(s) an evaluation in a display group.

Hence, it is possible for a user (for example, a driver) to understand an evaluation result intuitively by a radar chart, and further, it is possible to readily acquire a detail of an evaluation result of each display group and information that should be fed back to himself/herself, by selecting each item. Furthermore, information that is helpful for an evaluation result of a driver may be displayed in a radar chart in combination. For example, a previous score rate of a driver himself/herself, a departmental average, a certain-corporation average, and/or an all-corporation average may be displayed in a radar chart. Furthermore, information that is helpful for an evaluation result of a driver may be displayed simultaneously.

Thus, in a generation method according to an embodiment, a display group is set based on each evaluation item concerning a driving evaluation and a radar chart where a score rate of such a display group is displayed in each item thereof is generated. Therefore, in a display result generation method according to an embodiment, it is possible to prevent or reduce degradation of a visibility of a radar chart concerning a driving evaluation.

Figure 3:
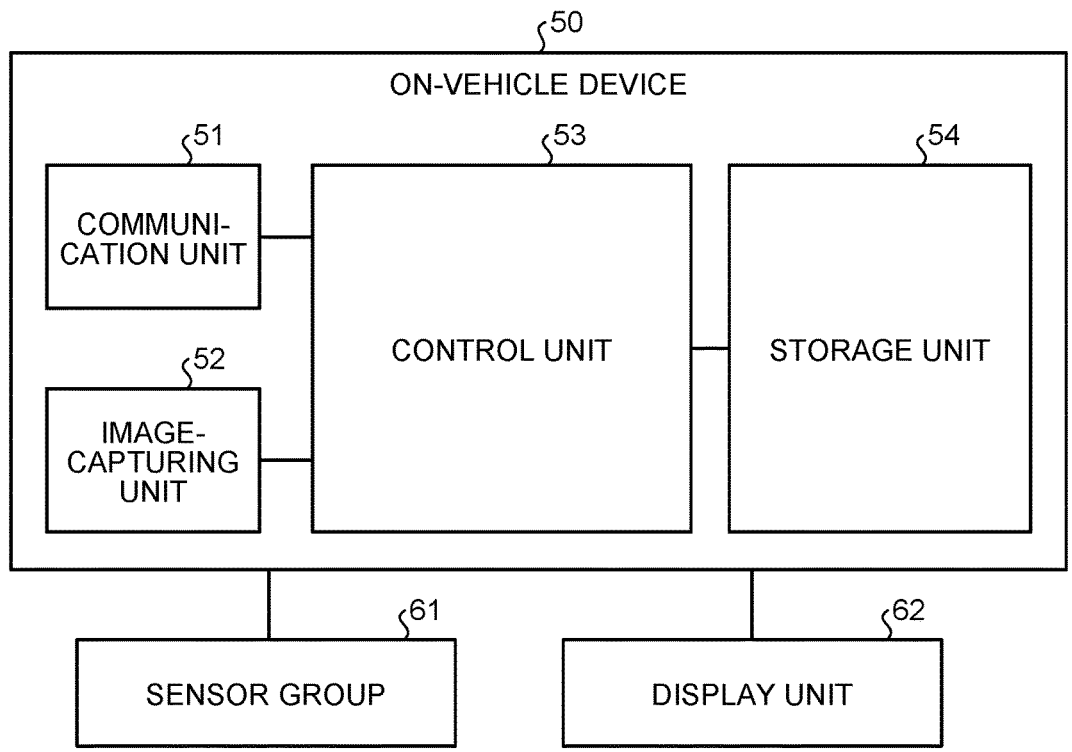
FIG. 3 is a block diagram of an on-vehicle device.

Next, a configuration example of an on-vehicle device 50 will be explained by using FIG. 3. FIG. 3 is a block diagram of the on-vehicle device 50. As illustrated in FIG. 3, the on-vehicle device 50 includes a communication unit 51, an image-capturing unit 52, a control unit 53, and a storage unit 54. Furthermore, the on-vehicle device 50 is connected to a sensor group 61 and a display unit 62.

The sensor group 61 includes, for example, various types of sensors that detect a running state of a vehicle C. Such various types of sensors include a vehicle speed sensor, a brake sensor, a steering angle sensor, an acceleration sensor, a position sensor, an obstacle detection sensor, etc.

The display unit 62 is a touch panel display that is mounted on a vehicle C. For example, the display unit 62 displays a video that is input from the on-vehicle device 50. Additionally, the display unit 62 may have a speaker that outputs a sound that is input from the on-vehicle device 50.

The communication unit 51 is realized by, for example, a Network Interface Card (NIC), etc. The communication unit 51 is connected to a predetermined communication network so as to be two-way-communicable and execute transmission/receipt of information to/from a display control device 10, etc.

The image-capturing unit 52 includes various types of image-capturing elements and captures an image of a surrounding of a vehicle C. Additionally, the on-vehicle device 50 may be configured to have the image-capturing unit 52 that captures an image of an inside (for example, a driver) of a vehicle.

The control unit 53 includes, for example, a computer that has a Central Processing Unit (CPU), a Read Only Memory (ROM), a Random Access Memory (RAM), a hard disk drive, an input/output port, etc., and/or various types of circuits. A CPU of a computer reads and executes, for example, a program that is stored in a ROM so as to function.

The control unit 53 stores, in the storage unit 54, various types of information that is input from the image-capturing unit 52 and the sensor group 61. The control unit 53 transmits, for example, driving information to the display control device 10 through the communication unit 51 with a predetermined period(s).

Herein, driving information includes image information, and positional information, vehicle speed information, acceleration information, steering information, etc., of a vehicle C. Furthermore, for example, the control unit 53 extracts image information in a specified period of time from the storage unit 54, based on request information that is transmitted from the display control device 10, and then, transmits it to the display control device 10.

That is, the on-vehicle device 50 preliminarily transmits simple driving information to the display control device 10, and transmits, in a case where a side of the display control device 10 determines that detailed analysis is needed, image information (a video) in a period of time when such analysis is needed, to the display control device 10. Thereby, it is possible to reduce communication traffic as compared with a case where all videos are uploaded to the display control device 10.

The storage unit 54 is a storage unit that is composed of, for example, a non-volatile memory and/or a storage device such as a data flash and/or a hard disk drive, and stores various types of driving information that is input from the image-capturing unit 52 and the sensor group 61.

Figure 4:
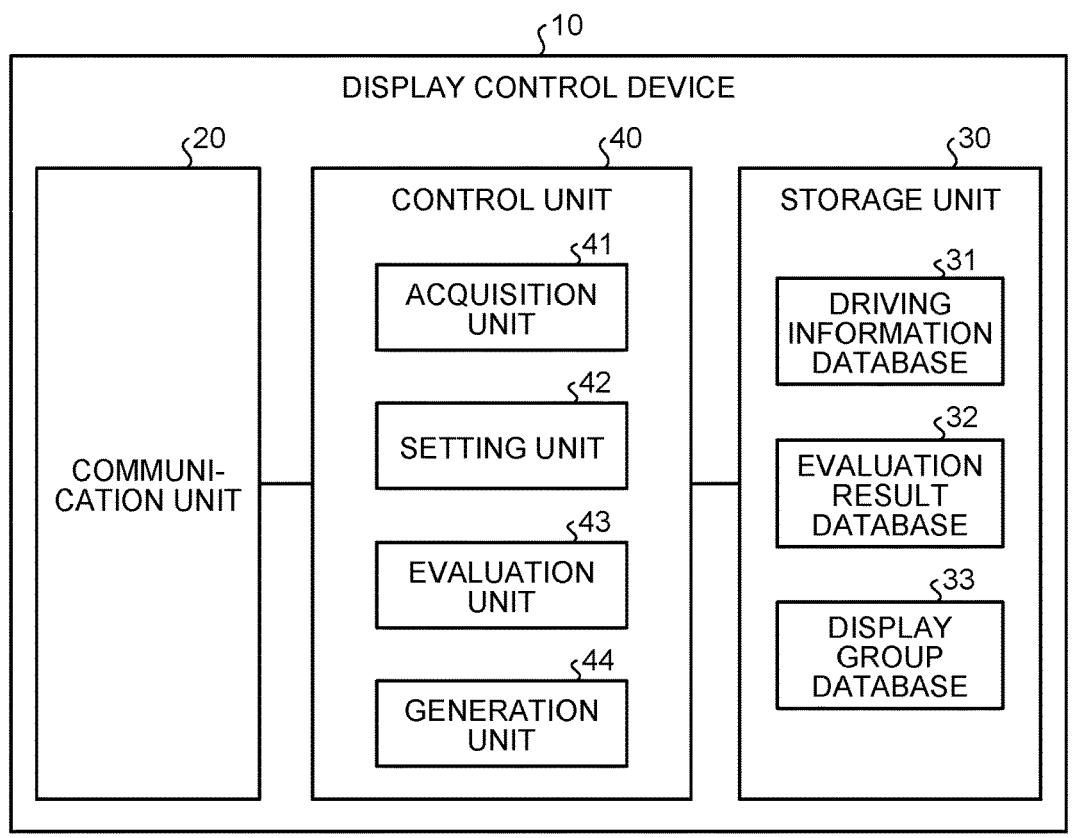
FIG. 4 is a block diagram of a display control device.

Subsequently, a configuration example of a display control device 10 will be explained by using FIG. 4. As illustrated in FIG. 4, the display control device 10 according to an embodiment includes a communication unit 20, a storage unit 30, and a control unit 40.

The communication unit 20 is realized by, for example, a Network Interface Card (NIC), etc. The communication unit 20 is connected to a predetermined communication network so as to be two-way-communicable and execute transmission/receipt of information to/from an on-vehicle device 50, etc.

The storage unit 30 is a storage unit that is composed of, for example, a non-volatile memory and/or a storage device such as a data flash and/or a hard disk drive. As illustrated in FIG. 4, the storage unit 30 has a driving information database 31, an evaluation result database 32, and a display group database 33.

The driving information database 31 is a database that stores driving information that is acquired from each on-vehicle device 50. The evaluation result database 32 is a database that stores an evaluation result of driving that is executed by a driver for each vehicle C.

Figures 5, 6:
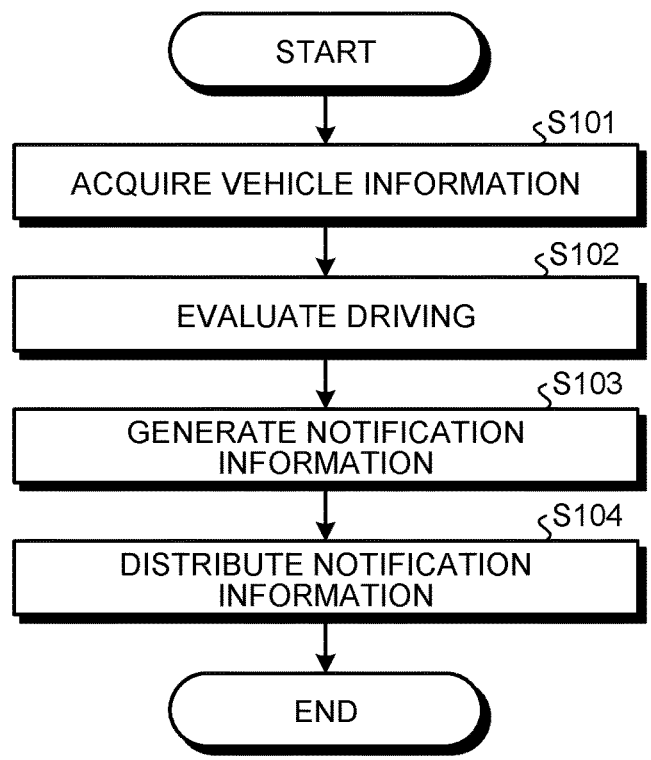
FIG. 5 is a diagram that illustrates an example of a display group database.
FIG. 6 is a flowchart that illustrates a process procedure that is executed by a display control device.

The display group database 33 is a database that stores information concerning a display group. FIG. 5 is a diagram that illustrates an example of a display group database 33. As illustrated in FIG. 5, the display group database 33 stores, for example, information for items such as a "USER ID", "EVALUATION ITEM 1", "EVALUATION ITEM 2", "EVALUATION ITEM 3", and/or "EVALUATION ITEM 4", so as to be associated with one another.

A "USER ID" is an identifier for identifying a user (a driver). Each of "EVALUATION ITEM 1" to "EVALUATION ITEM 4" indicates an evaluation item at a time when driving is evaluated, and indicates what display group such an evaluation item belongs to.

In an example of FIG. 5, for example, for a user that is identified by an user ID of "U01", each of evaluation items 1, 3, and 4 is provided in a display group of "GR1", so as to indicate that each of evaluation items 1, 3, and 4 is provided in a certain display group.

By returning to FIG. 4, the control unit 40 will be explained. The control unit 40 includes an acquisition unit 41, a setting unit 42, an evaluation unit 43, and a generation unit 44, and includes, for example, a computer that has a Central Processing Unit (CPU), a Read Only Memory (ROM), a Random Access Memory (RAM), a hard disk drive, an input/output port, etc., and/or various types of circuits.

A CPU of a computer reads and executes, for example, a program that is stored in a ROM so as to function as the acquisition unit 41, the setting unit 42, the evaluation unit 43, and the generation unit 44 of the control unit 40.

The acquisition unit 41 acquires driving information of each vehicle C from each on-vehicle device 50, and stores acquired driving information in the driving information database 31.

The setting unit 42 sets a display group and stores information concerning a set display group in the display group database 33. For example, the setting unit 42 set a display group based on information that is transmitted from a manager terminal 200 (see FIG. 1) or information that is transmitted from the on-vehicle device 50 (or a driver terminal 100).

Herein, setting a display group refers to setting a number of a display group(s), addition or deletion of an evaluation item in a display group, a name of a display group, etc. That is, in an example as described above, the setting unit 42 sets a specification of a display group depending on a user (a driver or a manager). Thereby, it is possible to attain improvement of convenience.

The evaluation unit 43 evaluates driving that is executed by a driver for each vehicle C. For example, the evaluation unit 43 analyzes driving information of each vehicle C and evaluates driving for each evaluation item. Herein, for an evaluation item, it is possible to provide an item that is based on Road Traffic Act, such as speed exceedance and/or temporary stop, an item concerning care of a driver at a time of driving, such as confirmation of both sides and/or inattentive driving, an item concerning a characteristic of a driver (for example, his/her character at a time of driving, etc.), an item concerning eco-driving, etc.

For example, the evaluation unit 43 executes an evaluation for such an evaluation item based on vehicle speed information, acceleration information, steering information, and/or various types of image information. Herein, for example, the evaluation unit 43 acquires, in a case where more detailed analysis is needed, detailed information from the on-vehicle device 50 based on an analysis result for positional information, vehicle speed information, acceleration information, and/or steering information of a vehicle C, and then, executes an evaluation.

The generation unit 44 generates notification information where the driver terminal 100 and/or the manager terminal 200 should be notified of. The generation unit 44 generates, as notification information, a radar chart that indicates an evaluation result of each display group where the radar chart displays a score rate of each display group in each item thereof.

The generation unit 44 generates, when such a radar chart is generated, a breakdown of each evaluation item in a display group, and/or a comment(s) where a user should be notified of for each display group. Moreover, the generation unit 44 extracts, from the driving information database 31, a video(s) of an event that influences an evaluation in each display group, and attaches it to notification information. Additionally, the generation unit 44 may attach a hyperlink destination (URL) where such a video(s) is/are stored to notification information.

Herein, an event that influences an evaluation is, for example, an event that is a target for point deduction in each evaluation item. As such a video(s) is/are provided, it is possible to induce a driver to review an event that is a target for point deduction, so that it is possible to induce improvement of awareness of safe driving.

Furthermore, the generation unit 44 extracts, for example, a traffic violation video and/or a near-miss incident video from the driving information database 31, so as to generate a safe driving teaching material. For example, the generation unit 44 transmits a generated safe driving teaching material to the driver terminal 100, so that it is possible to further induce a driver to improve awareness of safe driving. Additionally, for example, each evaluation item for "e-Learning-related" (see FIG. 2) is evaluated based on a viewing history of such a safe driving teaching material or a driving evaluation after viewing thereof.

Figure 7:
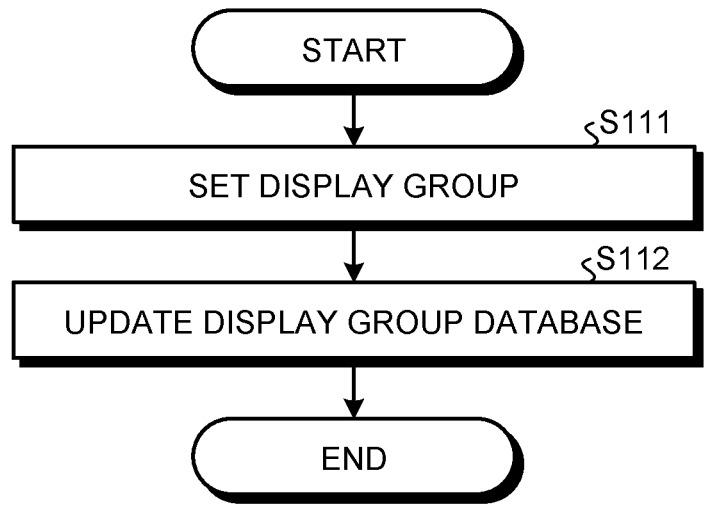
FIG. 7 is a flowchart that illustrates a process procedure that is executed by a display control device.
Figure 8:
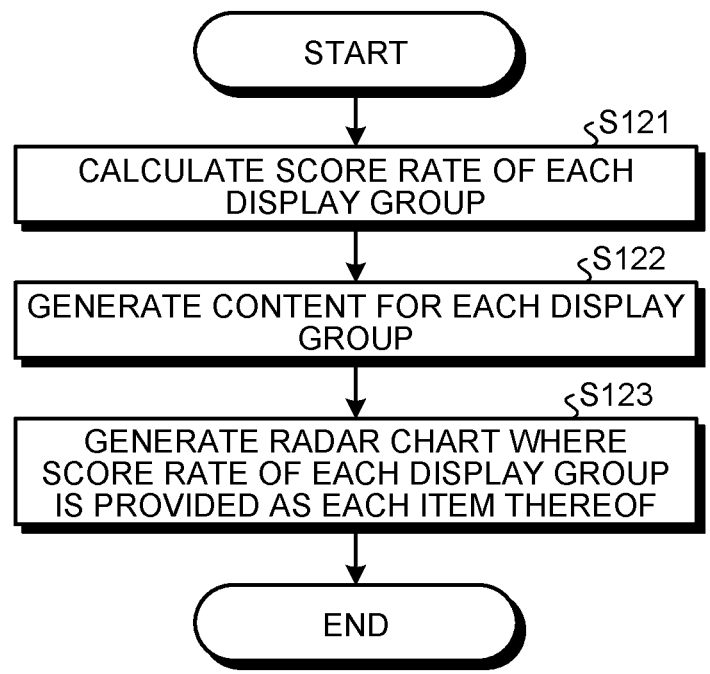
FIG. 8 is a flowchart that illustrates a process procedure that is executed by a display control device.

Next, a process procedure that is executed by a display control device 10 according to an embodiment will be explained by using FIG. 6 to FIG. 8. FIG. 6 to FIG. 8 are flowcharts that illustrate a process procedure that is executed by the display control device 10.

First, a series of process procedures for driving information will be explained by using FIG. 6. As illustrated in FIG. 6, first, the display control device 10 acquires vehicle information from each on-vehicle device 50 (step S101) and executes a driving evaluation (step S102).

Subsequently, the display control device 10 generates notification information based on an evaluation result (step S103) and distributes such notification information (step S104). Then, the display control device 10 ends such a process.

Next, a process procedure concerning setting of a display group will be explained by using FIG. 7. As illustrated in FIG. 7, first, the display control device 10 sets a display group (step S111). Subsequently, the display control device 10 updates a display group database 33 based on a setting content (step S112). Then, such a process is ended.

Next, a generation procedure for a radar chart will be explained by using FIG. 8. As illustrated in FIG. 8, first, the display control device 10 calculates a score rate of each display group (step S121). Subsequently, the display control device 10 generates a content for each display group (step S122).

Then, the display control device 10 generates a radar chart where a score rate of each display group is provided as each item thereof (step S123) and ends such a process.

As described above, a display control device 10 according to an embodiment is a display control device that evaluates driving of a vehicle C that is executed by a driver thereof for each evaluation item and includes a control unit 40 that sets a display group based on an evaluation item and generates a radar chart that indicates an evaluation result of each display group where the radar chart displays a score rate of each display group in each item thereof. Therefore, it is possible for a display control device 10 according to an embodiment to prevent or reduce degradation of a visibility of a radar chart concerning a driving evaluation.

Meanwhile, although a case where the display control device 10 is a server or a cloud system that aggregates driving information from each on-vehicle device 50 has been explained in an embodiment as described above, this is not limiting. A part or all of functions of the display control device 10 may be provided on the on-vehicle device 50. That is, the display control device 10 may be the on-vehicle device 50.

Additionally, in an embodiment as described above, the display control device 10 generates a radar chart. Although it is preferable that a radar chart is a raster image such as a bitmap and/or a vector image such as a Scalable Vector Graphic (SVG), this is not limiting. Such a chart may be rendered by the driver terminal 100 and/or the manager terminal 200.

In such a case, for example, the display control device 10 transmits a script that executes rendering of a radar chart and processed data for rendering such a radar chart to the driver terminal 100, etc. It is preferable to generate data and a script as HTML by using JavaScript (registered trademark), etc. In such a configuration, it is possible to readily realize, for example, dynamic chart display for a user operation.

Furthermore, a part or all of functions of the display control device 10 may be provided on the driver terminal 100 and/or the manager terminal 200. That is, it is a case where the driver terminal 100 also executes data processing for rendering a radar chart. This is, for example, a case where the display control device 10 is configured as an application that is operated on the driver terminal 100.

For example, in a case where the communication unit 20 and the control unit 40 are provided in the driver terminal 100, etc., it is preferable to aggregate the storage unit 30 in a server on a cloud. In such a case, the control unit 40 requests the storage unit 30 on a cloud to execute data transmission through the communication unit 20 when a radar chart is generated. The control unit 40 that acquires data from the storage unit 30 on a cloud executes data processing for displaying a radar chart and displays such a radar chart on the driver terminal 100.

Furthermore, in a case where the storage unit 30 is also provided in the driver terminal 100, etc., the control unit 40 may acquire data from the on-vehicle device 50. Furthermore, a configuration may be provided in such a manner that aggregation of data is executed on a cloud and data in the storage unit 30 are periodically synchronized at a preliminarily determined timing.

According to the present invention, it is possible to prevent or reduce degradation of a visibility of a radar chart concerning a driving evaluation.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:

1. A display control device that displays a result that is provided by evaluating driving of a vehicle that is executed by a driver for each evaluation item, wherein the display control device comprises:
 a processor programmed to:
  display, on a display device, a radar chart where a display group that includes the evaluation item is provided as an item and a score rate of the display group is provided as a value of the item; and
  display, in a case where a vertex of the radar chart is selected by a user, an automatically generated comment regarding a breakdown of an evaluation result of the display group that corresponds to the selected vertex.

2. The display control device according to claim 1, wherein
 the processor is further programmed to display the comment that is located at a position offset from the radar chart.

3. The display control device according to claim 1, wherein
 the processor is further programmed to display the breakdown of the evaluation result.

4. The display control device according to claim 1, wherein
 the processor is further programmed to extract a video of an event that influences an evaluation in the evaluation item that belongs to the display group, and display, in a case where a vertex of the radar chart is selected by a user, the extracted video on the display device.

5. The display control device according to claim 4, wherein
 the processor is further programmed to extract a video of an event that is a target for point deduction, as a video of an event that influences the evaluation.

6. A display control system, comprising:
 the display control device according to claim 1; and
 an on-vehicle device that transmits driving information concerning driving of the vehicle to the display control device.

7. A display control method that displays a result that is provided by evaluating driving of a vehicle that is executed by a driver for each evaluation item, wherein the method comprises:
 displaying, on a display device, a radar chart where a display group that includes the evaluation item is provided as an item and a score rate of the display group is provided as a value of the item; and
 displaying, in a case where a vertex of the radar chart is selected by a user, an automatically generated comment regarding a breakdown of an evaluation result of the display group that corresponds to the selected vertex.

8. A display control device, comprising:
 a processor programmed to
  produce, and display on a display device, a radar chart of driving evaluation for a vehicle driver, the radar chart including a plurality of axes representing driving evaluation categories, each of the driving evaluation categories including a plurality of evaluation items, the radar chart illustrating a score rate for each of the driving evaluation categories, and
  produce, in a case where a score rate for one of the driving evaluation categories is selected by a pointer on the radar chart, an evaluation comment based on score rates for the evaluation items on a selected evaluation category, and display the comment in a vicinity of the score rate on the display device.

* * * * *